United States Patent
Gellerich

(10) Patent No.: US 8,250,553 B2
(45) Date of Patent: *Aug. 21, 2012

(54) METHOD AND DATA PROCESSING SYSTEM FOR FINDING PROBLEMS CAUSED BY ACCESS TO UNINITIALIZED DATA STORAGE IN ASSEMBLER PROGRAMS

(75) Inventor: Wolfgang Gellerich, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 1545 days.

This patent is subject to a terminal disclaimer.

(21) Appl. No.: 11/690,978

(22) Filed: Mar. 26, 2007

(65) Prior Publication Data

US 2008/0028262 A1    Jan. 31, 2008

(51) Int. Cl.
*G06F 11/36* (2006.01)
(52) U.S. Cl. .................. 717/155; 717/156; 717/132
(58) Field of Classification Search .................. None
See application file for complete search history.

(56) References Cited

U.S. PATENT DOCUMENTS

| | | | | |
|---|---|---|---|---|
| 5,175,856 | A * | 12/1992 | Van Dyke et al. | 717/151 |
| 5,313,614 | A * | 5/1994 | Goettelmann et al. | 717/138 |
| 5,842,017 | A * | 11/1998 | Hookway et al. | 717/158 |
| 5,983,213 | A * | 11/1999 | Nakano et al. | 1/1 |
| 6,748,558 | B1 * | 6/2004 | Gonzales et al. | 714/47.1 |
| 2001/0032215 | A1 | 10/2001 | Kyle et al. | |
| 2001/0037218 | A1 | 11/2001 | Kaker et al. | |
| 2001/0044811 | A1 * | 11/2001 | Ballantyne et al. | 707/513 |
| 2002/0019910 | A1 * | 2/2002 | Pitsianis et al. | 711/125 |
| 2003/0023955 | A1 * | 1/2003 | Bates et al. | 717/129 |
| 2005/0014842 | A1 * | 1/2005 | Baumann et al. | 514/622 |
| 2005/0027953 | A1 * | 2/2005 | McIntosh et al. | 711/158 |
| 2005/0246693 | A1 * | 11/2005 | Plum | 717/140 |
| 2006/0130021 | A1 * | 6/2006 | Plum et al. | 717/140 |
| 2006/0200754 | A1 | 9/2006 | Kablesh et al. | |
| 2007/0094048 | A1 | 4/2007 | Grichnik | |
| 2007/0198296 | A1 | 8/2007 | Pellinat et al. | |
| 2007/0203753 | A1 | 8/2007 | Hasan et al. | |

(Continued)

OTHER PUBLICATIONS

Cooper et. al "Building a Control Flow-Graph From Scheduled Assembly Code" http://hipersoft.cs.rice.edu/grads/publications, 2002.*

(Continued)

*Primary Examiner* — Li Zhen
*Assistant Examiner* — V Miller
(74) *Attorney, Agent, or Firm* — Cantor Colburn LLP; Dennis Jung

(57) ABSTRACT

A method for detecting problems caused by access to incompletely initialized data storage in assembler programs includes generating an internal representation of control flow of the source code of the assembler program including nodes for every statement found in the source code and a directed edge for every possible flow of control between the nodes. The method also includes: attributing data attributes to the nodes and/or the edges, wherein the data attributes are used to store the information how many bits within the data storage can be guaranteed to be initialized; applying a data-flow analysis method to the internal representation of the control flow of the source code for determining how many bits of the data storage can be guaranteed to be initialized; checking for each node whether the instruction reads more bits than are guaranteed to be initialized; and generating one or more error messages responsive to the problem.

12 Claims, 3 Drawing Sheets

U.S. PATENT DOCUMENTS

| | | | |
|---|---|---|---|
| 2007/0271121 | A1 | 11/2007 | Laudan et al. |
| 2007/0288266 | A1 | 12/2007 | Sysko et al. |
| 2008/0235567 | A1 | 9/2008 | Raj et al. |
| 2009/0299761 | A1 | 12/2009 | Thakur et al. |

OTHER PUBLICATIONS

U.S. Appl. No. 12/130,094, Non-Final Office Action dated Jul. 26, 2011; pp. 1-22.

L. Djoudi et al., "MAQAO: Modular Assembler Quality Analyzer and Optimizer for Itanium 2", Workshop on EPIC Architectures and Compiler Technology; EPIC(4): pp. 1-20 (Mar. 2005) (San Jose, CA).

M.P. Ward et al., "Legacy Assembler Reengineering and Migration", IEEE Computer Society; 20th ICSM (2004), pp. 157-166.

Abbas, et al., "Adaptive Context for Medical Information Systems", ICDIM'07, 2007 pp. 1-6, IEEE.

Abidi et al., "An Intelligent Info-Structure for Composing and Pushing Personalised Healthcare Information Over the Internet", 14TH IEEE Symposium on Computer Based Medical Systems, 2001, pp. 225-230.

Abidi, S., "A Case Base Reasoning Framework to Author Personalized Health Maintenance Information", IEEE Symposium on Computer-Based Medical Systems (CBMS 2002), 2002, pp. 1-6, IEEE.

Curro, V. et al., "Man-Machine Interfaces to Medical Information Systems", IEEE Engineering in Medicine & Biology Society 10th Annual International Conference—1341 CH2566-8/88/0000—1341, pp. 1-2, 1988, IEEE.

Isern, et al., "Using Aggregation Operators to Personalize Agent-Based Medical Services", KES 2006, Part II, LNAI 4252, 2006, pp. 1256-1263, Springer, Germany.

McRoy, S., et al., "Interactive Computerized Health Care Education," Journal of the American Medical Informatics Association; JAMIA, [online]; [retrieved on Feb. 4, 2010]; retrieved from the Internet http://jamia.bmj.com/content/5/4/347.full.html Jul./Aug. 1998, pp. 347-356, vol. 5 No. 4, BMJ group.

Office Action—Final for U.S. Appl. No. 12/130,094, filed May 30, 2008; First Named Inventor: Wolfgang Gellerich; Mail Date: Jan. 6, 2012.

Office Action—Non-Final for U.S. Appl. No. 12/700,339, filed Feb. 4, 2010; First Named Inentor: Varun Bhagwan; Mail Date Dec. 22, 2011.

Quintana, Y., "Intelligent Medical Information Filtering," [online]; [retrieved on Feb. 4, 2010] retrieved from the Internet www.yuriquintana.com/papers/Quintana-Information-Filtering.pdf; 1998, 17 pages.

Yang, et al., "A Personalized Products Selection Assistance Based on E-Commerce Machine Learning", Proc. of 3rd International Conference on Maching Learning and Cybernetics, 2004, pp. 2629-2633, IEEE.

\* cited by examiner

```
                    ; ASSUME REGISTER R1 DOES NOT CONTAIN MEANINGFUL
                    ; DATA AT THIS POINT
         INST2 R1           ; SETS RIGHTMOST 8 BITS IN R1
         CONDJUMP LABEL1    ; JUMPS IF A CONDITION IS TRUE
         INST1 R1           ; SETS RIGHTMOST 16 BITS IN R1
LABEL1:  INST3 R1           ; READS RIGHTMOST 16 BITS IN R1
```

METHOD AND DATA PROCESSING SYSTEM FOR FINDING PROBLEMS CAUSED BY ACCESS TO UNINITIALIZED DATA STORAGE IN ASSEMBLER PROGRAMS

FIELD OF THE INVENTION

The invention relates to a method and data processing system for finding problems assembler programs whereby the cause of the problem is an access to data which has not been completely initialized.

DESCRIPTION AND DISADVANTAGES OF PRIOR ART

Today, most programming is done using a so-called higher-level programming language like C or Java. Programs developed using such a language are translated into machine-executable format by using a compiler. However, there remain many application areas where programs must still be developed in assembler language. Examples for such areas are hardware-oriented programs like hardware device drivers, the implementation of complex instructions within a processor, or the software layer between the hardware of a computer and an operating system.

A typical example for today's application of assembler programming is the Millicode layer found on the IBM zSeries computer system.

Any computer program can contain errors. A typical example is reading data which is not or not completely initialized and thus contains unexpected values, causing the affected program to report erroneous results or to behave in some unpredictable way. Prior art for finding such problems are human activities like testing and doing code reviews. Performing tests can be supported by simulators that help to identify the location of a problem. These techniques are used for both, programs written in higher-level programming languages and in assembler. Additionally, there are automated tools for finding problems in higher-level programming language source code. These tools apply techniques summarized under the term static program analysis. The value of such tools is that they run automatically, and that they tend to find problems that are likely to get missed by tests and reviews.

One important algorithm used for static program analysis is data-flow analysis which iteratively solves a set of data-flow equations in order to derive information later used for detecting bugs. Data-flow analysis applies a mathematical model based on an arithmetic structure named lattice.

Assembler programming is more difficult and error-prone than program development using a higher-level programming language in that they may suffer not only from using uninitialized data but also from using partially initialized data. This kind of problem is specific to assembler programming.

Many of today's processors, including the IBM zSeries architecture, provide rather wide registers, e.g., consisting of 64 bits. However, some applications do not exploit this feature or even gain from using smaller registers. It is therefore common practice that a processor also provides instructions which use registers in limited width. Typical values are 32 bit, 16 bit, and 8 bit.

However, this creates a new type of possible errors. A program which initializes only k bits of a register but later executes an instruction which reads 1.1>k bits of the same register has an error. This problem can be considered a generalization of the error of using uninitialized variables in programs written in a higher-level programming language. However, the problem of accessing a partially initialized register as described above is not possible when using a higher-level programming language. A typical application area where such problems occur is the development of zSeries Millicode.

FIG. 1 shows an example assembler program consisting of four assembler instructions. All access the same register, R1. Assume that register R1 is 64 bit wide. Instructions Inst1 and Inst2, respectively, assign a value to the right-most 8 and 16 bits of R1. Later, a third instruction, Inst3, reads the value of the right-most 16 bits stored in register R1. Depending on whether the value of R1 was set by Inst1 or Inst2, the read operation performed by Inst3 assesses uninitialized bits.

It is important to note that the application area of the present algorithm is not limited to registers but applies to any kind of data storage.

It is important to note that those problems cannot occur in higher-level programming languages because the semantics of assigning a value represented by a smaller amount of bits to a variable providing a higher number of bits causes the unused leasing bits to be implicitly set to zero or one, depending on the sign of the variables and the value being assigned.

Prior art for finding such problems is either doing code reviews or extensive testing, possibly with the aid of simulators. Code reviews are, however, expensive and problems of this kind are easily missed. Testing will find the problem only if there is a test case that triggers the erroneous situation. In general, it is the case that the control flow does not just flow straight forward but has plenty of branches, forward jumps and backward jumps. Also, the test case must be designed such that its output depends on the erroneous access. Using a simulation tool to run the test cases makes the situation somewhat easier as the simulator can perform checks that will detect and report the erroneous access immediately. The disadvantage of this approach is the slow execution time of simulators. Also, the problem persists that there must be a test case triggering the erroneous situation.

There is some other work related to program analysis: Recently, the so-called post-pass optimization has been introduced into compiler construction. This technique consists of an additional optimization pass after the whole program has been compiled and linked, i.e., the input to the post-pass optimizer is a binary. The advantage of this final pass is that all information is complete, while the compiler usually only operates on parts of the whole program. Post-pass optimizations seem to be most popular for single-chip controllers and similar projects that do not apply dynamic linking. Post-pass optimization may well apply techniques like data-flow analysis to gather information that is later used to decide on certain code optimizations. Post-pass optimization does, however, not try to find problems. In contrast, given that the input is generated by a compiler, it is considered correct. Post-pass optimization is an optimization technique, seeking reduce the run-time and/or space needed by a program, but it is not a software engineering tool.

Currently available techniques of static code analysis are applied to high-level programming but cannot find accesses to incompletely initialized data in assembler programs.

Tools are available which build a control flow graph for assembler programs and provide an interface which allows the user to query some properties of the code. This approach does, however, not apply data-flow techniques.

There is an approach to re-engineer legacy assembler programs yielding high-level source code. The approach translates assembler code into an internal representation and applies several analysis to it. This included data-flow analysis, but only to detect possible bodies of subroutines. The suggested tool does not check assembler programs for correctness.

OBJECT OF THE PRESENT INVENTION

It is object of the present invention to provide a method and data processing system for finding problems caused by access to incompletely initialized data storage in assembler programs avoiding the disadvantages of the prior art.

SUMMARY OF THE INVENTION

The present invention provides a system and method for finding problems caused by access to incompletely initialized data storage in assembler programs comprising:
a) Generating an internal representation of control flow of the source code of the assembler program by using standard techniques of compiler constructions, wherein said internal representation contains nodes for every statement found in said source code and a directed edge for every possible flow of control between said nodes,
b) Attributing data attributes to said nodes and/or said edges, wherein said data attributes are used to store the information how many bits within the data storage can be guaranteed to be initialized,
c) Applying a data-flow analysis method to said internal representation of the control flow of the source code for determining how many bits of the data storage can be guaranteed to be initialized, comprising:
c1) Initializing all of said attributes of said internal representation of the control flow of the source code with an initial value,
c2) Providing access to the following input parameters:
numbers of bits read by said statement associated to said node,
number of bits written by said statement,
and all attributes of the nodes from which a directed edge to said node for the attribute is currently being calculated,
c3) calculating for each of said nodes a real value for said attribute associated to said node based on said parameters,
c4) repeating calculating step in c3) until for all attributes the newly computed real value remains unchanged,
d) checking for each node whether the instruction reads more bits than are guaranteed to be initialized, and
e) taking an appropriate action in order to overcome said problem.

A further embodiment of the present invention is easily extended to check more than just one resource.

A further embodiment of the present invention is to use techniques which are known to improve the representation of the CFG with respect to execution time and/or space. One approach is that nodes do not contain single instructions but so-called basic blocks which consist of a linear sequence of instructions which does not have any branches internally.

A further embodiment of the present invention provides an optimization of the CFG representation by using the static single assignment form (SSA). This technique reduces the overhead for propagating data-flow information through the CFG.

A further embodiment of the present invention uses an additional function. The checking function could trace the calculation of data-flow information and output possible flows of execution that lead to an error message. This would help users locating the problem.

BRIEF DESCRIPTION OF THE DRAWINGS

In the following, preferred embodiments of the invention will be described in greater detail by making reference to the drawings in which.

DETAILED DESCRIPTION

Figure 3:
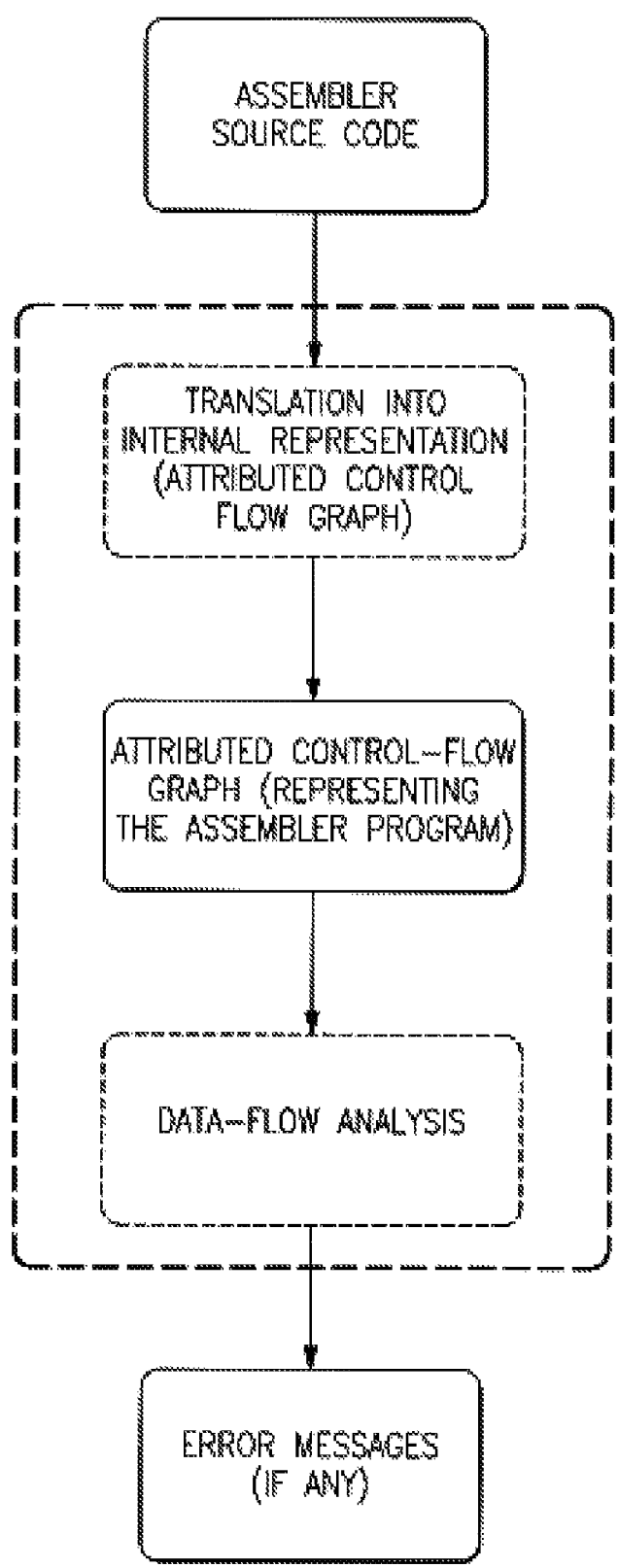
FIG. 3 shows a block diagram demonstrating the overall application of the invention and its major components.
Figure 4:
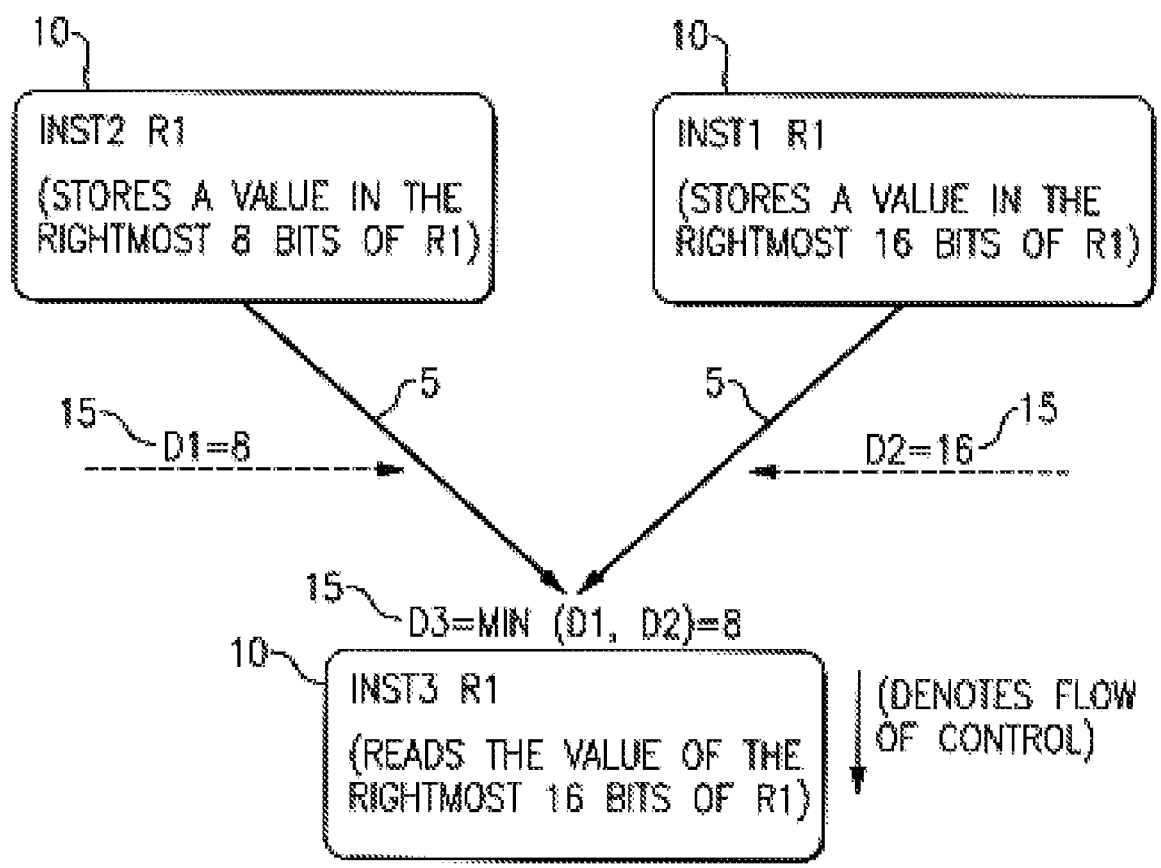
FIG. 4 shows the control-flow graph for the assembler program given in FIG. 1 and also contains data attributes.

FIG. 3 shows a block diagram of a data processing system according to the invention. A method for finding problems that are caused by access to variables that are not fully initialized according to the present invention consists of the following steps:
1. Initially, the assembler program to be checked is available in source code form, e.g., as a text.
2. The next step is to read this text (FIG. 1) and translate the program into an internal representation which has the form of a control-flow graph (FIG. 4). This translation process is done using standard programming techniques like scanning and parsing which are known in the field of compiler construction (Compiler construction tools like e.g. "flex" and "bison" can be used to implement the code performing the translation). The control-flow graph contains one node (10) for every statement found in the assembler program and a directed edge (5) for every possible flow of control.
3. The control-flow graph is annotated with data attributes D (15). These attributes are used to store the information how many bits of the register being checked are guaranteed to be hold a valid value.
4. Next, the data-flow analysis algorithm modified according to the invention performs the following steps:
4.1 It initializes these data attributes with the initial value 0. This value reflects the fact that no registers contain a useful value when the program starts and that the algorithm has not yet derived information about their possible initialization by the program.
4.2 The real values of the data attributes are calculated using an iterative algorithm for solving data-flow equations. Data-flow equation previously used in other application areas (e.g., for analyzing high-level programs) are replaced. The new equations model the behaviour of assembler program execution with respect to the problem of partially initialized registers. In particular, the new equations reflect the following cases:
    4.2a) Whenever an instruction sets k bits of a register, the data attribute has value k after that instruction. The information how many bits of a register a certain instruction writes is either obvious from the source code of the assembler program or is documented in the manufacturer's description of the processor.
    4.2b) Whenever several possible flows of control join at a certain node, the data attribute available at that node is calculated by the meet-operation.
This informal description is given more precise in the form of some equations below. These equations are based on a modified flow-function, a modified meet-operator, and a modified in-function which are explained below in detail.

4.3 The iterative process of calculating the real values for the data attributes applies the data-flow equations described in (a). The algorithm consists of the following steps:

STEP1: assign the value 0 to variable C.

STEP2: calculate the new value for every data attribute by evaluating every data-flow equation. If the new value is different to the former value for at least one data attribute, assign the value 1 to variable C. The equations can be evaluated in any order.

STEP3: If variable C equals 1, then continue with STEP1. Otherwise, the data attributes now contain the final values.

Some mathematical properties (to be given below) of the procedure described in 4.1 and 4.2 guarantee that the procedure will finally terminate with correct results.

4.4 After having calculated the real values of the data attributes, the invention checks for every instruction whether it accesses a resource which is not available at that point.

4.5 For all instructions suffering from this problem, an error message is reported to the user.

The iterative procedure that is common to all previous applications of data-flow analysis is also used by the present invention. Additionally, the invention contains the following new functional components that are needed to calculate the real values of the data attributes:

a) A new flow-function F that reflects how many bits of a certain operand every possible assemble instruction will write.

b) The meet-operation is defined such that it combines the data-flow information associated with uniting flows of control in a way that yields a conservative estimation of the initialization of the respective register.

c) An in-function is defined for every node in a way that it combines the data-flow information reaching via all incoming control-flow edges in a way that yields a conservative estimation of the initialization of the register to be checked. This combination of the information associated with incoming edges is performed by means of the newly defined meet-operator.

The following sections describe the algorithm in detail, starting with an extended example and finally verifying its formal correctness.

Figures 1, 2:
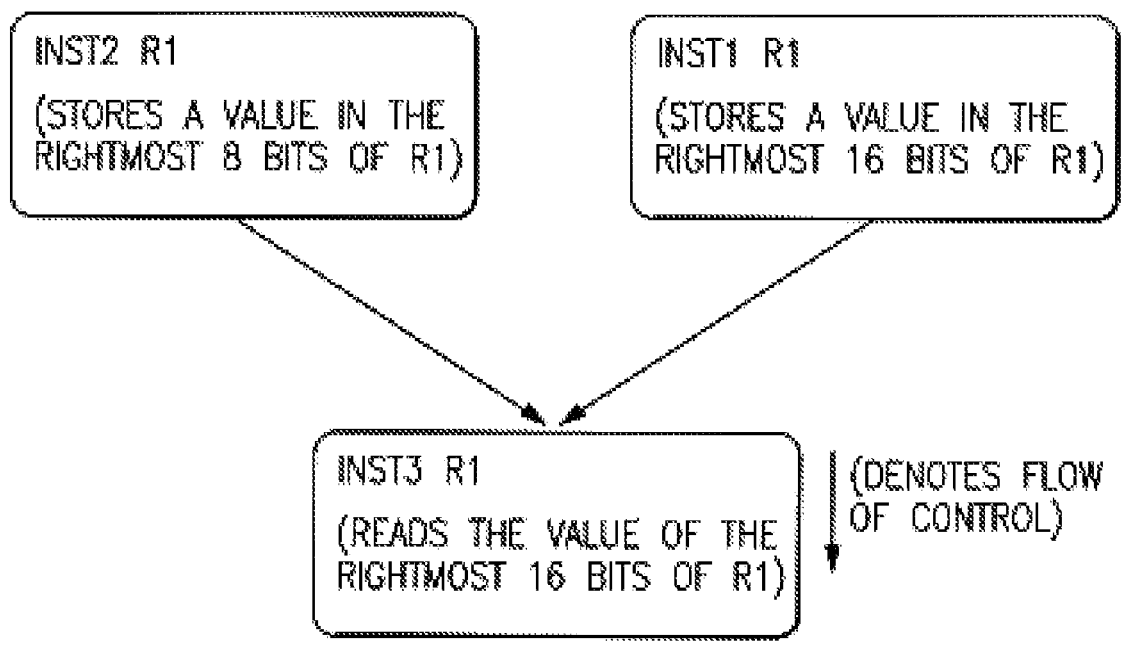
FIG. 1 shows an example for an assembler program that has a problem caused by a possible access to an uninitialized register.
FIG. 2 shows the control-slow graph derived from the example assembler program in FIG. 1.

FIG. 4 continues the example that began in the section "Description and disadvantages of prior art" and used FIGS. 1 and 2, respectively. FIG. 4 is annotated with the data-flow information referred to in step 3. These additional data fields are named data attributes. They represent the information "how many bits of the register are guaranteed to be initialized" that was given informally in the introductory example. In general, there can be data attributes for as many entries as the application requires. The example uses just one attribute which refers to register R1.

The data-flow analysis algorithm applied by the invention calculates the value of such data-flow information that is valid at the beginning of every instruction. The information how many cycles the execution of a certain instruction takes is represented by the above-mentioned flow-function.

In general, programs are not restricted to linear sequences only. FIG. 4 shows an example control-flow graph with two possible flows of control joining at node Inst3. The data attributes associated with the joining edges must be combined in some way. For the intended correctness check it is appropriate to make a worst-case assumption. The data attribute resulting from some joining edges therefore contains the maximum value. In the example, the flow of control may either come from Inst1 of from Inst2. The register R1 has 8 or 16 bits initialized, respectively. Since both paths are possible at run-time, a safe assumption is that the register R1 has its rightmost 8 bits initialized. Formally, this combination of information associated with some control flow paths that join at some point is performed by the meet-operation mentioned above.

The in-function mentioned above is applied to calculate the data-flow information valid at the beginning of any instruction. Its input data are the edges arriving at the node, the data-flow information valid at the nodes from where the flow of control might come, the flow function, and the meet-operation. This framework is able to calculate exact values for the data-flow information for any node in the control-flow graph, even if this graph contains arbitrary edges (introduced by jump statements in the original assembler program), including any kind of cycles.

Mathematical Definition of the Data-Flow Equations

The algorithm for computing the data-attributes exploits some properties of an algebraic structure named lattice and is proven to produce correct results iteratively. Experience showed that it executes quite efficiently.

The "pure" algorithm does not define what kind of information certain symbols would carry, nor what operations are defined on these symbols. It is only defined that these operations must meet certain properties. Well-known instantiations of this algorithm include a number of program analysis problems performed by compilers as a prerequisite for deciding which optimizations can be performed in a certain situation.

The following sections define a lattice and a set of equations which can be solved in order to calculate the value of all data attributes in every case.

For simplicity, let assume that there is only one single register to be checked. This is no restriction with respect to the power of the analysis algorithm proposed.

$$x \sqcap y = \min(x,y) \quad (1)$$

The lattice L consists of the set of all possible numbers of bits. For $x, y \in L$ a meet operation is defined as follows:

This operation meets models joining control flow edges. A complete lattice definition would also contain a join operation which, however, is not needed here.

A control flow graph (CFG) contains a node for every instruction of the program being checked, and a directed edge for every possible flow of control. For every node N the function PRED returns the set of all nodes from which there is a control flow edge to n. The CFG has a special node named "entry" where the execution begins. For every node N there is a function in (N) which returns the value for the data attribute D associated with the node.

$$F(D, \mathit{inst}) = \begin{cases} c & \text{if } \mathit{inst} \text{ modifies the right-most } c \text{ bits} \\ & \text{of the register} \\ D & \text{otherwise} \end{cases} \quad (2)$$

A flow function F models the effect of arbitrary instructions which either store a value into the right-most c bits of the register of do not modify the value of the register.

To calculate the value of the data attributes D associated with every node N, a set of equations D=in{N} is introduced whereby function in is given as where instP is the $$in(n) = \begin{cases} 0 & \text{if } n \text{ is the entry} \\ \sqcap_{P \in PRED(n)} F((in(P), instP) & \text{otherwise} \end{cases} \quad (3)$$

instruction associated with node N. For the entry node where the program execution starts, function in always returns 0, reflecting the fact that no bits of the register have yet been assigned a value. For all other nodes, the respective in value is calculated from the values associated with all incoming edges using the meet operation, and these are calculated by applying the appropriate flow function F (instP) which models the effect of the instruction in node P to the data attribute associated with node P.

Mathematical Correctness

The iterative algorithm described above will only work correctly if the lattice meets a certain condition. The flow functions F as defined by equation (3) must be monotone with respect to the partial order defined by:

$$\forall x,y \in L: (x \sqsubseteq y) \Leftrightarrow (x \sqcap y = x) \quad (4)$$

The definition of being monotone is $$\forall x,y \in L: (x \sqsubseteq y) \Rightarrow (F(x) \sqsubseteq F(y)) \quad (5)$$

for some instruction inst. However, using equation 1), the equation (5) can be rephrased as $$\forall x,y \in L: \min(x,y) = x \Leftrightarrow \min(F(x,inst), F(y,inst)) = F(x, inst) \quad (6)$$

From the definition of the flow function in (3) it is obvious that (6) holds.

The invention claimed is:

1. Method for detecting problems caused by access to incompletely initialized data storage in assembler programs comprising:
  a) Generating an internal representation of control flow of the source code of the assembler program by using standard techniques of compiler constructions, wherein said internal representation contains nodes for every statement found in said source code and a directed edge for every possible flow of control between said nodes,
  b) Attributing data attributes to said nodes and/or said edges, wherein said data attributes are used to store information about how many bits within the data storage can be guaranteed to be initialized,
  c) Applying a data-flow analysis method to said internal representation of the control flow of the source code for determining how many bits of the data storage can be guaranteed to be initialized, comprising:
    c1) Initializing all of said attributes of said internal representation of the control flow of the source code with an initial value,
    c2) Providing access to the following input parameters: numbers of bits read by said statement associated to said node, number of bits written by said statement, and all attributes of the nodes from which a directed edge to said node for the attribute is currently being calculated,
    c3) calculating for each of said nodes a real value for said attribute associated to said node based on said parameters,
    c4) repeating calculating step in c3) until for all attributes the newly computed real value remains unchanged,
  d) checking for each node whether the instruction reads more bits than are guaranteed to be initialized, and
  e) generating one or more error messages responsive to the problem;
  wherein said calculation of said real values additionally records which statement is a reason why one or more bits of the data storage are unavailable and provides that information in addition to a report of accesses to only partly initialized registers.

2. Method according to 1, wherein said internal representation of said control flow of the source code is represented in a form of control flow graph, wherein said nodes in said control flow graph may represent basic blocks which summarize the sequence of statements which will be executed by said control flow in a linear sequence.

3. Method according to claim 1, wherein said internal representation of said control flow of said source code is constructed according to the principles of static single assignment form.

4. Method according to claim 1, wherein said initial value of said attribute is 0.

5. Method according to claim 1, wherein action to be taken is to present the access to the partially initialized register to user by means of a user interface.

6. Method according to claim 5, wherein said access to an only partly initialized register is presented by the line number of the statement.

7. Method according to claim 1, wherein C2 takes care for registers set upon program start and contain incoming parameters.

8. Computer program products stored on non-transitory computer usable medium comprising readable program means for causing a computer to perform the method claim 1, when said computer program is executed on a computer.

9. Data processing system for detecting problems caused by access to incompletely initialized data storage in assembler programs comprising:
  a) means for generating an internal representation of control flow of the source code of the assembler program by using standard techniques of compiler constructions, wherein said internal representation contains nodes for every statement found in said source code and a directed edge for every possible flow of control between nodes,
  b) means for attributing data attributes to said nodes and/or said edges, wherein said data attributes are used to store information about how many bits within the data storage can be guaranteed to be initialized,
  c) means for applying a data-flow analysis method to said internal representation of the control flow of the source code for determining how many bits of the data storage can be guaranteed to be initialized, comprising:
    c1) means for initializing all of said attributes of said internal representation of the control flow of the source code with an initial value,
    c2) means for providing access to the following input parameters: numbers of bits read by said statement associated to said node, number of bits written by said statement, and all attributes of the nodes from which a directed edge to said node for the attribute is currently being calculated,
    c3) means for calculating for each of said nodes a real value for said attribute associated to said node based on said parameters,
    c4) means for repeating calculating step in C3) until for all attributes the newly computed real value remains unchanged,
  d) means for checking for each node whether the instruction reads more bits than are guaranteed to be initialized, and
  e) means for generating one or more error messages responsive to the problem;
  wherein said calculation of said real values additionally records which statement is a reason why one or more bits of the data storage are unavailable and provides that information in addition to a report of accesses to only partly initialized registers.

10. System according to 9, wherein said internal representation of said control flow of the source code is represented in a form of control flow graph, wherein said nodes in control flow graph may represent basic blocks which summarize the sequence of statements which will be executed by said control flow in a linear sequence.

11. System according to claim 10, wherein said internal representation of said control flow of said source code is constructed according to the principles of static single assignment form.

12. System according to claim 9, wherein said initial value of said attribute is 0.

* * * * *